United States Patent [19]

Smith, Jr.

[11] 4,398,174
[45] Aug. 9, 1983

[54] FUEL CONSUMPTION SIGNALLING SYSTEM

[76] Inventor: Raymond P. Smith, Jr., P.O. Box 294, 129 Susquehanna St., Williamsport, Pa. 17701

[21] Appl. No.: 207,652

[22] Filed: Nov. 17, 1980

Related U.S. Application Data

[63] Continuation of Ser. No. 27,614, Apr. 5, 1979.

[51] Int. Cl.³ .................. F01D 21/02; B60Q 1/00
[52] U.S. Cl. ...................... 340/53; 180/171; 180/282; 340/52 D; 340/60; 340/669
[58] Field of Search ............ 340/52 R, 52 D, 53, 340/60, 669; 180/170, 171, 174, 282

[56] References Cited

U.S. PATENT DOCUMENTS

| | | |
|---|---|---|
| 2,666,197 | 9/1949 | Polymeros . |
| 2,683,782 | 8/1952 | Corssen . |
| 2,692,980 | 3/1952 | Platt . |
| 2,738,404 | 11/1952 | Fitzsimmons . |
| 2,834,953 | 3/1975 | Bechberger et al. . |
| 2,870,753 | 7/1954 | Shuck et al. . |
| 3,647,016 | 8/1969 | Fitzsimmons et al. . |
| 3,909,778 | 9/1975 | Maria et al. .......... 340/52 R |
| 3,925,753 | 2/1975 | Auman et al. . |
| 3,938,074 | 2/1976 | Fox ................... 340/52 R |
| 4,025,897 | 5/1977 | Kisuna et al. ......... 340/52 D |
| 4,065,961 | 1/1977 | Crew ..................... 340/60 |
| 4,093,929 | 2/1977 | Mitchell . |

Primary Examiner—John W. Caldwell, Sr.
Assistant Examiner—Joseph E. Nowicki
Attorney, Agent, or Firm—Irons and Sears

[57] ABSTRACT

A fuel consumption signalling system for signalling both efficient and inefficient fuel consumption conditions in the engine of a motor vehicle is herein disclosed. The system comprises an alarm circuit connected in series with an indicator circuit including an indicator light connected in parallel with a vacuum operated switch pneumatically connected to the engine manifold. An electric potential sufficient to actuate the alarm circuit, but insufficient to actuate both the indicator light and the alarm circuit is applied across the series connected indicator and alarm circuits. When the engine is consuming fuel efficiently, the vacuum switch is open, and the electric potential is divided between the indicator circuit and the alarm circuit. The divided potential is sufficient to illuminate the indicator light, but insufficient to actuate the alarm circuit. However, when the engine consumes fuel inefficiently, the vacuum switch closes, shunting the entire electric potential across the alarm circuit, thereby actuating it. The signalling system may also include an automatic throttle plate control.

14 Claims, 4 Drawing Figures

U.S. Patent  Aug. 9, 1983  Sheet 1 of 2  4,398,174
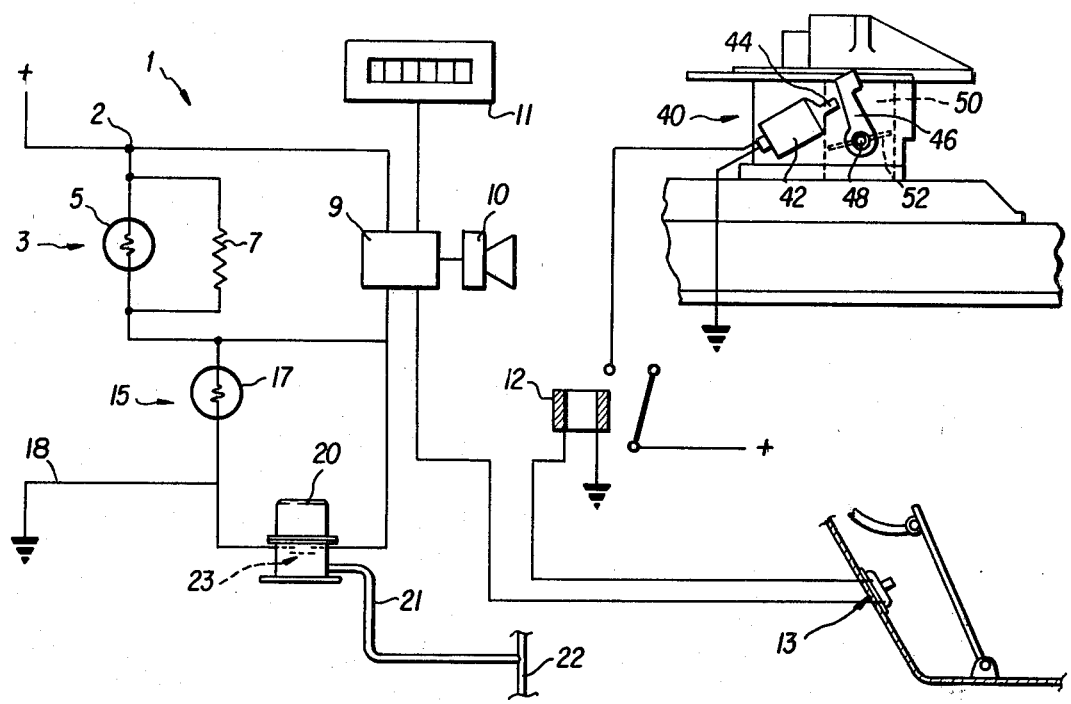
FIG. 1
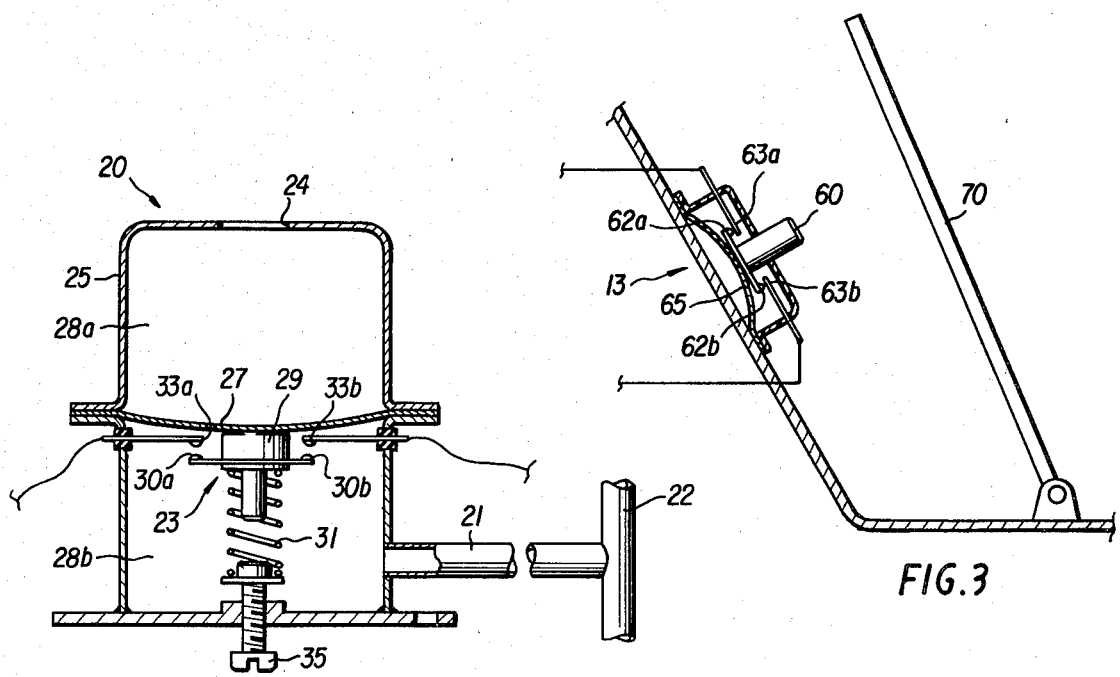
FIG. 2
FIG. 3

FUEL CONSUMPTION SIGNALLING SYSTEM

This is a continuation, of application Ser. No. 027,614, filed Apr. 5, 1979.

BACKGROUND OF THE INVENTION

In recent years, the rising cost of fuel has sharply increased the need for more efficient consumption of fuel. One well known, but little used method of efficient fuel consumption in a motor vehicle lies in the conscientious use of fuel saving driving techniques. In fact, a 1978 United States government publication entitled "Driver Aid and Education Test Project" (DOE/CS-0043) and prepared for the U.S. Department of Energy states, on page 1, that it is ". . . not unusual to find a variation of 30 to 50 percent in fuel economy among a group of non-professional drivers operating under identical and controlled test conditions . . . ", the difference being attributable solely to individual driving techniques. Thus, it is clear that significant amounts of fuel could be saved by the widespread adoption of fuel efficient driving techniques by the motor vehicle operators of this country.

To encourage the use of such efficient driving techniques, a variety of fuel consumption gauges and indicators have been provided by the prior art. Such prior art fuel consumption gauges have typically utilized a vacuum operated sensor to monitor the manifold pressure of the engine, as the manifold pressure is one of the best over all indicators of efficient fuel use. A high vacuum pressure in the engine manifold indicates that the fuel is being burned in a fuel to air ratio which results in complete, and hence efficient, combustion. By contrast, a low vacuum pressure in the manifold indicates that the fuel is being burned in an overly rich fuel to air ratio which results in incomplete, and hence inefficient, combustion. In operation, the vacuum operated sensor of typical prior art devices senses whether the pressure of the engine manifold is in a high or low vacuum state, and transmits this information to an indicator which in turn indicates to the driver whether or not the motor vehicle is being driven in a fuel efficient fashion.

Unfortunately, each of the prior art fuel consumption indicators has, thus far, been attended by a variety of technical drawbacks which in turn has discouraged its general use among the motor vehicle operators of this country. For example, Polymeros U.S. Pat. No. 2,666,197 discloses a vacuum operated signal device having a vacuum operated switch adapted to be mounted on the instrument panel of an automobile. However, the single pilot light of Polymeros' invention only gives a visual indication of an inefficient fuel consumption condition in the engine which is easily overlooked by a driver observing the road. Further, the suggested location of the single pilot light of this invention between other lights and indicators on the instrument panel of the automobile makes installation difficult, and renders the single pilot light less perceptible to the driver than if the signal light were mounted away from the other lights and dials of the instrument panel. Finally, because the pilot light is actuated only during a fuel wastage condition in the engine, it is difficult to tell at any given time whether or not the invention is operative.

While Corsseu U.S. Pat. No. 2,683,782, Shuck U.S. Pat. No. 2,870,753, and Platt U.S. Pat. No. 2,692,980 each disclose manifold pressure indicators utilizing two separate signalling devices for signalling both efficient and inefficient fuel consumption conditions in an internal combustion engine, they suffer from the drawback of utilizing relatively intricate and expensive single pole, double throw or double pole vacuum operated switches. Additionally, each of these devices utilizes only a pilot light for indicating an inefficient fuel consumption condition which again can be easily overlooked by an operator with his full attention on the road.

Finally, although the manifold pressure indicator disclosed in Australian Pat. No. 114,535 suggests the use of an audio signal to signal an inefficient fuel condition, this device, like the Polymeros invention, is capable of signalling only an inefficient fuel consumption condition. Additionally, no suggestion is made as to how to conveniently mount this device in the cockpit of a conventional motor vehicle.

Clearly the need exists for a conveniently installable, simple, effective and inexpensive fuel consumption signalling system which has at least two separate signalling devices for positively signalling both efficient and inefficient fuel consumption conditions.

SUMMARY OF THE INVENTION

The invention relates to a fuel consumption signalling system which is conveniently installable within a conventional motor vehicle and which has two separate signalling devices for signalling both efficient and inefficient fuel consumption conditions in the engine of a motor vehicle without any of the drawbacks associated with prior art devices of this type. Basically, the signalling system comprises an alarm circuit for indicating an inefficient fuel consumption condition which is connected in series with an indicator circuit for indicating an efficient fuel consumption condition. The alarm circuit includes an alarm light, a resistor, and a time delay circuit having an audio alarm generator, each of which is connected to the other in parallel. The indicator circuit includes an indicator light and a normally open vacuum operated switch connected together in parallel. The vacuum operated switch is pneumatically connected to the engine manifold of the motor vehicle. A source of electrical potential sufficient enough to actuate the alarm circuit, but insufficient to actuate both the alarm circuit and the indicator light of the indicator circuit is applied across the series connected alarm and indicator circuits.

In operation, the vacuum operated switch closes when the manifold pressure attains a value indicative of inefficient fuel consumption, thereby shunting the entire electrical potential around the indicator light and across the alarm circuit. Thus, the indicator light is extinguished and the alarm circuit is actuated, perceptibly illuminating the alarm light and triggering the time delay circuit. If the inefficient fuel consumption condition lasts beyond a preset amount of time, the time delay circuit then actuates an audio alarm generator.

Both the series circuit and the vacuum operated switch are mounted in a box-like housing which is conveniently installable either above or below the instrument panel of a conventional motor vehicle by means of simple brackets.

Thus, the invention provides an easily installable, simple, effective and inexpensive fuel consumption signalling device having two separate indicators for positively signalling both efficient and inefficient fuel consumption conditions in an engine. The use of a simple, single pole, vacuum operated switch in a dual signalling system instead of the intricate and more expensive multipole vacuum switches frequently associated with the prior art devices significantly reduces costs while increasing reliability. More particularly, the use of a simple, single pole vacuum switch in combination with an indicator light which serves the dual function of indicating a fuel efficient condition while providing a voltage divider along the series circuit constitutes a significant improvement over the prior art, providing maximum performance with a minimum of parts.

Finally, the use of a time delay circuit between the alarm circuit and the audio signal generator prevents the audio alarm from being prematurely actuated during necessary periods of inefficient fuel usage, such as those which occur during the emergency handling of the motor vehicle.

The fuel consumption signalling system may also include an automatic throttle control for automatically eliminating inefficient fuel consumption condition. The automatic throttle control basically comprises a lever connected to the carburetor throttle blade rod of the motor vehicle engine, and a solenoid having an extensible plunger for limiting the movement of this lever. The solenoid is actuated by a relay connected to the time delay circuit of the alarm circuit, so that the throttle control, like the audio alarm generator, becomes actuated only if the inefficient fuel consumption condition lasts beyond a preset amount of time.

The system also includes a means for overriding the throttle control including a microswitch mounted under the gas pedal for breaking the connection between the relay and the time delay circuit when the gas pedal is pressed to the floor of the motor vehicle.

Additionally, an electronic counter may be connected to the time delay circuit of the alarm circuit for counting and displaying the number of times a gas wastage condition occured which lasted beyond the present delay period of the time delay circuit.

BRIEF DESCRIPTION OF THE SEVERAL DRAWINGS

FIG. 1 is an electromechanical diagram of the circuit of the fuel consumption signalling system installed in a conventional motor vehicle;

FIG. 2 illustrates a cross sectional side view of the vacuum operated switch of the fuel consumption signalling system;

FIG. 3 illustrates a cross sectional side view of the microswitch of the throttle control override means as it would appear mounted in a conventional motor vehicle.

DETAILED DESCRIPTION OF THE INVENTION

Figure 4:
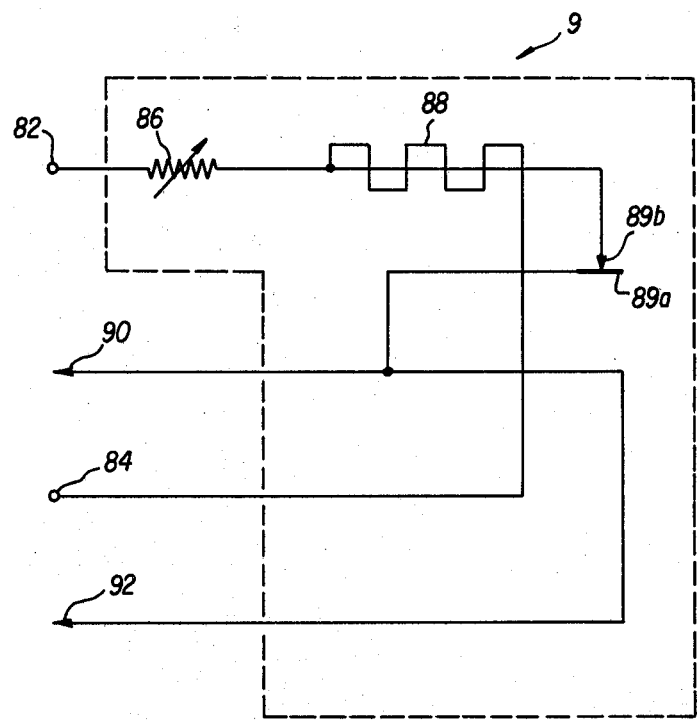
FIG. 4 is a schematic of the time delay circuit of the invention.

With reference to FIG. 1, the system 1 basically comprises an alarm circuit 3 connected in series with an indicator circuit.

The alarm circuit includes an alarm light 5, a resistor 7 and a time delay circuit 9 including an audio alarm generator 10, each of which is connected to the other in parallel as indicated. In the preferred embodiment, alarm light 5 comprises a red GE #18 miniature lamp having an electrical resistance of approximately 30 ohms, resistor 7 has a resistance of approximately 75 ohms, and time delay circuit 9 has a resistance of over 300 ohms, such that the entire alarm circuit has a resistance of about 20 ohms. Time delay circuit 9 serves as a time delay switch delaying the actuation of the audio alarm generator 10, the counter 11 and the throttle plate control 40 for a period of about three seconds to allow for short, necessary periods of fuel wastage, such as might occur in emergency handling situations. Additionally, time delay circuit 9 is preferably adjustable so that drivers driving in hilly terrain or other conditions which regularly demand unusually long periods of gas wastage may adjust the time delay for a period over three seconds. Time delay circuit 9 is described more particularly hereafter. A variety of prior art audio signal generators may comprise the audio signal generator 10 of the invention, such as the Mallory "Son Alert" (part number SC 628) or Edwards "Lumatone" (part number E 101). Finally, a number of prior art electric counters and display devices may likewise comprise the counter 11 of the invention, such as AMP thumbwheel switch number 0.300 (7.62), which is connected to the time delay circuit 9 and counts and displays the number of fuel wastage occasions lasting longer than the time delay of the time delay circuit 9.

The indicator circuit 15 includes an indicator light 17 connected in parallel to a normally open, vacuum operated switch 20. In the preferred embodiment, indicator light 17 is a green, GE #73 light bulb having a resistance of approximately 30 ohms.

A 12 volt source of potential difference is connected at points 12 and 18 of the series circuit, as shown. In the preferred embodiment this source of potential difference comprises the ignition system of the vehicle, rather than the car battery, so that the system will automatically turn on and off with the engine of the vehicle.

With reference now to FIG. 2, the normally open vacuum operated switch 20 of the system 1 includes a housing divided into two noncommunicating pneumatic chambers 28a, 28b by a resilient diaphram 27 as shown. The upper surface of diaphragm 27 is placed in pneumatic communication with the ambient atmosphere by aperture 24. The bottom surface of diaphragm 27 is placed in pneumatic communication with the engine manifold (not shown) by means of a vacuum line 21 terminating in a "T" joint which is preferably conveniently connected to the pneumatic circuit powering the intake manifold of the vehicle, although any point will do. A plunger member 29 having a pair of bimetallic electrical contacts 30a, b is biased against the lower surface of diaphragm 27 by means of coil spring 31. A complementary pair of contacts 33a, b connected in parallel with indicator light 17 is placed above the contacts 30a, b. Adjustment screw 35 balances the spring biasing force exerted on the underside of diaphragm 27 against the pneumatic force exerted on the top surface of diaphragm 27 by the atmosphere. More particularly, the adjustment screw 35 balances the spring and the pneumatic forces so that the contacts 30a, b and 33a, b remain out of conductive engagement when a fuel efficient, high vacuum is present in the manifold, but come together in conductive engagement when a fuel wasting low vacuum is present in the manifold. For a V-8 engine, adjustment screw 35 is adjusted so that the contacts 30a, b and 33a, b do not come into conducting engagement until the manifold pressure falls to about seven inches of mercury. For six and four cylinder cars, the screw is adjusted to a setting corresponding to about six and three and a half inches of mercury, respectively.

In operation, a 12 volt potential difference is connected across the series circuit comprising alarm circuit 3 and indicator circuit 15 at points 2 and 18 when the engine of the vehicle is started.

If the vacuum pressure in the engine manifold is high enough to keep contacts 30a, b and 33a, b from coming into conductive engagement, the 12 volt potential is divided between the indicator light 17 of the indicator circuit 15 and the alarm circuit 3. The divided potential across the indicator light 17 is sufficient to perceptibly illuminate it. By contrast, the potential divided across the alarm circuit 3 is insufficient to either trigger time delay circuit 9, which does not become actuated before a certain threshold voltage is attained, or perceptibly illuminate alarm light 3, due to the effect of resistor 7 in dropping some of the potential across the incandescent element of light 5.

However, if the manifold pressure falls below an appropriate preset value, the contacts 30a, b and 33a, b come into conducting engagement, extinguishing indicator light 17 and shunting the entire potential difference between points 2 and 18 across alarm circuit 3, actuating it. It should be noted in closing that indicator light 15 serves to provide a voltage divider between the source of electric potential and the alarm circuit 15 so that the latter is not actuated until the engine is operated in a fuel wasteful fashion, as well as an indicator for positively indicating when the vehicle is being operated in a fuel efficient manner. The indicator light 17 also serves as a positive indicator that the invention is functioning properly.

With reference again to FIG. 1, the system may also include a throttle plate control 40 comprising a relay 12 which is connected to time delay circuit for actuating a solenoid 42 having a plunger 44 for limiting the motion of a lever connected to the throttle plate rod of the carburetor 50 of the engine of the motor vehicle. The throttle plate control also includes an override control comprised of a microswitch 13 for breaking the electrical connection between relay 12 and time delay circuit 9, which in turn disconnects solenoid 42 from the ignition system of the vehicle, retracting plunger 44 from lever 46 and allowing free movement of the throttle plate 52 of the carburetor 50.

With reference now to FIG. 3, microswitch 13 comprises a plunger 60 slidably mounted in a housing 61 having a pair of contacts 62a, b normally biased against a pair of complementary contacts 63a, b by a leaf spring 65. Leaf spring 65 serves to bias contacts 62a, b against complementary contacts 63a, b such that relay 12 is normally electrically connected to time delay circuit 9. Leaf spring 65 also serves to provide an audible and tactile indicator of when the throttle plate control is overriden by providing an audible and tactile "click" when the operator floors gas pedal 70 against plunger 60 of microswitch 13, as is discussed in detail hereafter.

In operation, the throttle plate control 42 is actuated by time delay circuit 9, which closes relay 12 a present time after alarm circuit 3 is actuated. Relay 12 connects solenoid 42 to the ignition system of the vehicle, which in turn forcibly extends plunger 44 to a position which limits the movement of lever 46. This action in turn obstructs the carburetor throttle plate from assuming an angular position which would lower the manifold vacuum pressure and result in fuel wastage. If the operator of the vehicle needs to temporarily override the throttle plate control 40, as could occur in emergency driving conditions, the driver floors the gas pedal 70 of the vehicle, thereby depressing plunger 60 into leaf spring 65. The leaf spring 65 yields much the same way the metal blister structure on the bottom of a conventional oil can does, thereby disengaging contacts 62a, b and 63a, b with both an audible and a tactile click. The contact arm of relay 12 returns to its normal position, disconnecting solenoid 42 from the ignition system of the vehicle. Solenoid 42 then retracts plunger 44, which in turn frees lever arm 42.

Referring finally to FIG. 4, the time delay circuit 9 of the invention comprises a series connected thermal element 88 and potentiometer 86 which in turn is connected in parallel with the alarm circuit 3 at points 82 and 84. The thermal element 88 regulates switching contact points 89a and 89b. When the alarm circuit is actuated, the thermal element 88 expands after a time delay to close switching contact points 82 and 84, thereby actuating the audio signal generator 10, the electric counter 11, and throttle plate control relay 12. The duration of the time delay is controlled by potentiometer 86.

All of the aforementioned components of the system, with the exception of the throttle plate control 40 and override switch 13, may be mounted in a single, conveniently installable box-like housing (not shown) which may be attached either on the top or the bottom of the instrument panel by any suitable means, such as brackets.

Having particularly pointed out my invention in such full, clear, and concise and exact terms as to enable any person skilled in the pertinent art to make and use the same, I claim:

1. A fuel consumption signalling system for signalling both efficient and inefficient fuel consumption conditions in the engine of a motor vehicle, comprising:
   (a) an alarm circuit including, connected in parallel, an alarm light and a resistor, said alarm circuit being actuatable by a predetermined potential difference;
   (b) an indicator circuit connected to said alarm circuit in series to form a series circuit, said indicator circuit including, connected in parallel,
      (i) an indicator light for indicating an efficient operating condition in the motor vehicle engine and for serving as a voltage divider for any potential applied across said series circuit, and
      (ii) a vacuum operated, normally open switch pneumatically connected to the engine manifold for shunting any electric potential applied across said indicator lamp around said indicator lamp when the manifold pressure closes said switch, and
   (c) means for applying a potential difference across the series circuit, said applied potential being greater than the potential necessary to actuate the alarm circuit when said potential is shunted around the indicator light when the vacuum operated switch is closed, but less than the potential necessary to actuate the alarm circuit when the switch is open and the applied potential is divided between the indicator light and the alarm circuit.

2. The fuel consumption signalling system of claim 1, wherein said alarm circuit further includes, connected in parallel, a time delay circuit for actuating an audio alarm generator a preset time after said alarm circuit is actuated.

3. The fuel consumption signalling system of claim 2 further including a digital counting means connected to said time delay circuit for counting and displaying the number of occasions the engine was run in inefficient fuel consumption condition for a period of time greater than the time delay of said time delay circuit.

4. The fuel consumption signalling system of claim 3 further including a relay connected to the time delay circuit for actuating a throttle plate control a preset time after said alarm circuit is actuated.

5. The fuel consumption signalling system of claim 4, wherein said throttle plate control comprises:
  (a) a lever connected to the carburetor throttle blade rod of the engine of the motor vehicle, and
  (b) a solenoid actuatable by said relay and having an extensible plunger for limiting the motion of said lever when said solenoid is actuated, whereby the position of the throttle plate is automatically confined to an angular position consistent with efficient fuel consumption a preset time after said alarm circuit is actuated.

6. The fuel cunsumption signalling system of claim 5, further including means for overriding said throttle plate control including a microswitch mounted under the accelerator pedal of the motor vehicle for electrically disconnecting said relay from said time delay circuit when said accelerator is pressed to the floor of the vehicle,
  whereby said extensible solenoid plunger retracts to allow free movement of said lever connected to said throttle plate rod.

7. The fuel consumption signalling system of claim 6, wherein said microswitch includes a tactile indicating means for indicating when said switch is operated to disconnect said relay from said time delay circuit.

8. The fuel consumption signalling system of claim 7, wherein said time delay circuit is adjustable to actuate said audio alarm generator, said counter, and said throttle plate control at a variety of times after said alarm circuit is actuated.

9. A fuel consumption signalling system for signalling both efficient and inefficient fuel consumption conditions in the engine of a motor vehicle, comprising:
  (a) an alarm circuit including, connected in parallel, an alarm light, a resistor, and a time delay circuit having an audio alarm generator, said alarm circuit being actuatable by a predetermined potential difference;
  (b) an indicator circuit connected in series with said alarm circuit to form a series circuit, said indicator circuit including, connected in parallel,
    (i) an indicator light for indicating an efficient operating condition in the engine of the motor vehicle and for serving as a voltage divider for any potential applied across said series circuit, and
    (ii) a vacuum operated, normally open switch pneumatically connected to the engine manifold of the motor vehicle for shunting any electric potential applied across said indicator lamp around said lamp when a predetermined manifold pressure indicative of a fuel waste condition closes said switch, and
  (c) means for applying a potential difference across the series circuit, said potential difference being greater than the predetermined potential difference necessary to actuate the alarm circuit when said vacuum operated switch is closed, but less than the predetermined potential necessary to actuate the alarm circuit when the switch is open and the potential difference is divided between said indicator light and said alarm circuit.

10. The fuel consumption signalling system of claim 9 further including a digital counting means connected to said time delay circuit for counting and displaying the number of occasions an inefficient fuel consumption operating condition lasted in said engine for a time period greater than the present time delay period of said time delay circuit.

11. The fuel consumption signalling system of claim 10, further including a relay connected to said time delay circuit for actuating a throttle plate control a preset time after said alarm circuit is actuated.

12. The fuel consumption signalling system of claim 11, wherein said throttle plate control includes:
  (a) a lever connected to the throttle plate rod of the carburetor of the engine of the motor vehicle, and
  (b) a solenoid actuatable by said relay and having an extensible plunger for limiting the movement of said lever when said solenoid is actuated,
  whereby the position of the throttle plate is automatically confined to an angular position consistent with efficient fuel consumption a preset time after said alarm circuit is actuated.

13. The fuel consumption signalling system of claim 12, further including means for overriding said throttle plate control including a microswitch mounted under the accelerator pedal of the motor vehicle for electrically disconnecting said relay from said time delay circuit when said accelerator is pressed to the floor of the vehicle.

14. The fuel consumption signalling system of claim 13, wherein said microswitch includes a tactile indicating means for indicating when said switch is operated to disconnect said relay from said time delay circuit.

* * * * *